W. Read.
Revolving Horse Rake.
N° 81,003. Patented Aug. 11, 1868.
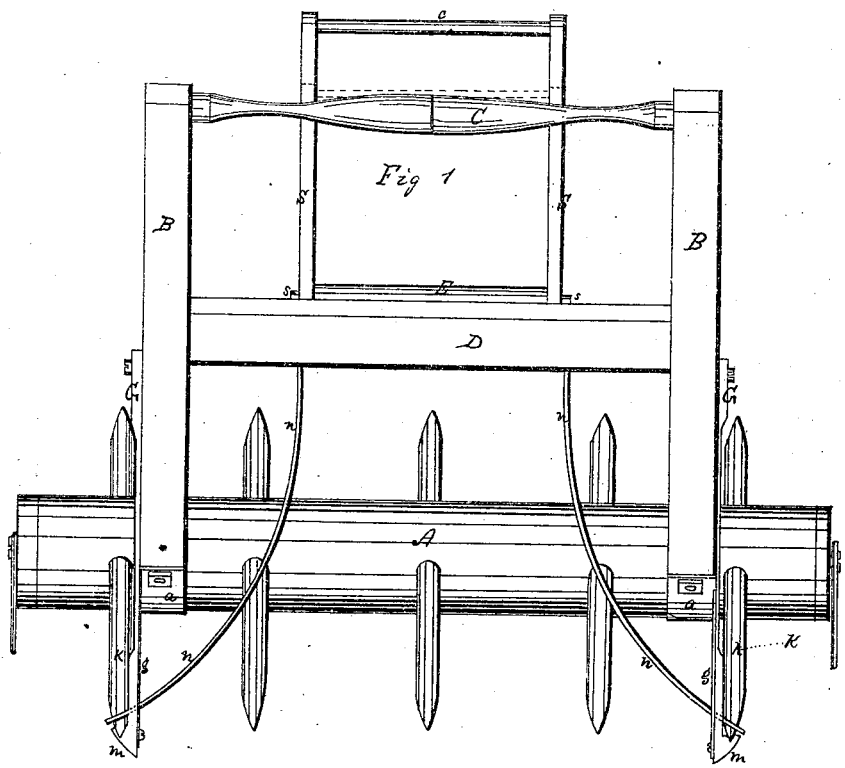
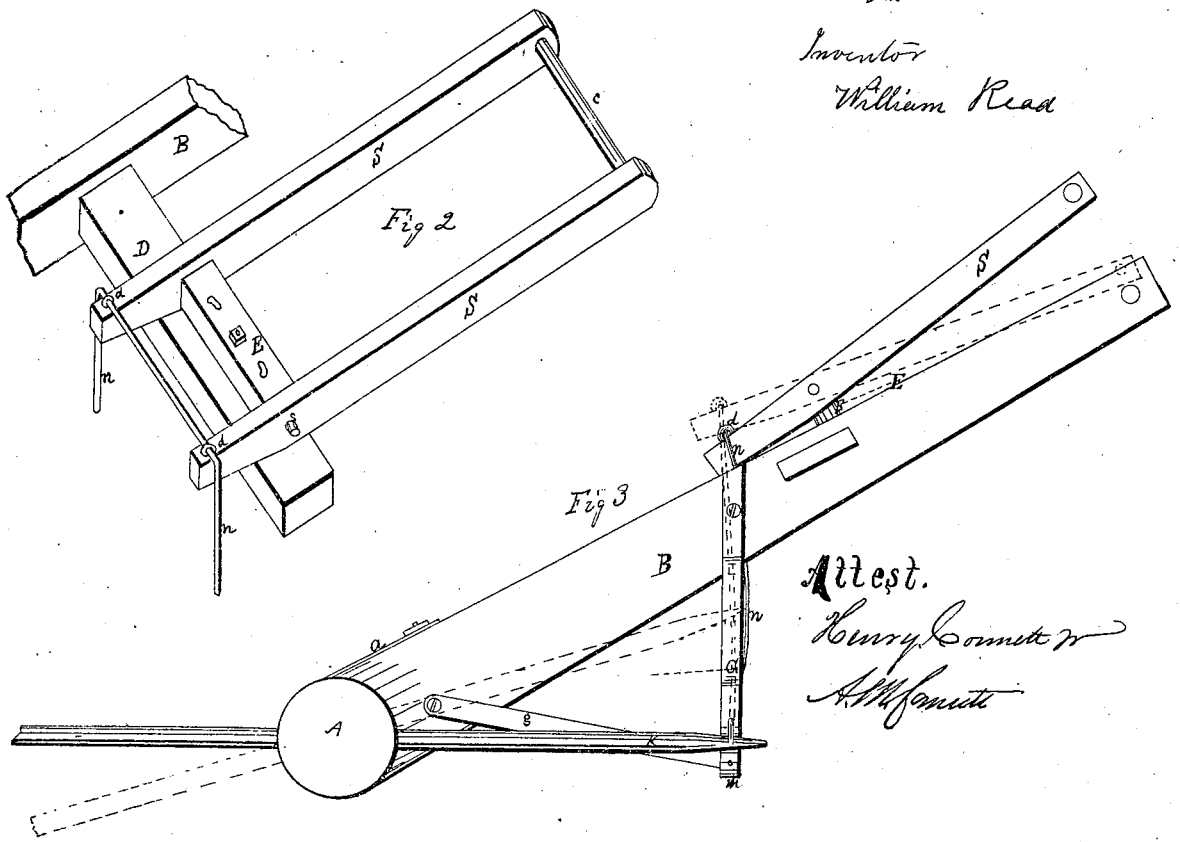
Inventor
William Read
Attest.
Henry Connett
A. W. Connett

United States Patent Office.

WILLIAM READ, OF VERNON, INDIANA.

Letters Patent No. 81,003, dated August 11, 1868.

IMPROVEMENT IN HORSE-RAKES.

*The Schedule referred to in these Letters Patent and making part of the same.*

TO ALL WHOM IT MAY CONCERN:

Be it known that I, WILLIAM READ, of Vernon, in the county of Jennings, and State of Indiana, have invented new and useful Improvements in Revolving Hay-Rakes; and I do hereby declare that the following is a full, clear, and exact description thereof, which will enable those skilled in the art to make and use the same, reference being had to the accompanying drawings, forming part of this specification.

This invention relates to an improved arrangement for releasing the rake-head and allowing it to make a half revolution, and an automatic spring-catch, to prevent any backward motion, the whole being completely under the control of the operator.

Figure 1 is an oblique projection of the rear of the rake.

Figure 2 is an isometrical perspective of the lever-frame.

Figure 3 is a side elevation.

A is the rake-head, and B B are the handles. These have straps, $a\ a$, at their ends, in which the rake-head revolves in the usual manner. The handles are connected at the top by the hand-bar C, and have between them the tie-beam D. On this beam is bolted the fulcrum-piece E. The bars S S and stretcher $c$ form a lever-frame, which is pivoted on the fulcrum E by means of the pins $s\ s$. G G are vertical springs, bolted on the outside of the handles B B, as shown, their lower ends having catches for the reception of the teeth $k\ k$, and their tips bevelled to form wipes $m\ m$. These springs are backed and supported by the springs $g\ g$, the front ends of which are bolted to the handles B B, and the others to the wipes $m\ m$.

On the forward ends of the bars S S are rings or staples $d\ d$. A metallic rod or bar is passed through these, (see fig. 2,) and each end bent downward, curving outward, as shown in fig. 1, the tips passing through suitable openings in the springs G G a sufficient distance above the catches in their lower ends to permit the teeth $k\ k$ to rest on the catch and under the tips of the rod. This rod forms a draw-spring by reason of the curve given it, so that when the bale portion of it (between the staples $d\ d$) is raised by pressing down the stretcher $c$ until it rests on the hand-bar C, as shown in red lines, figs. 1 and 3, the tips of the spring $n$ are drawn back flush with the outsides of the springs G G, and the teeth $k\ k$ are free to rise. When the stretcher $c$ is released, the tension on the spring is relaxed, and it immediately assumes its original position, the tips projecting, as shown.

Operation.

In using the rake, the operator has only to press down the rear end of the lever frame by means of the stretcher $c$, until it comes in contact with the hand-bar C, to release the rake and permit it to revolve. When a half revolution has been made, the opposite ends of the teeth come in contact with the wipes $m\ m$, pressing the springs G G back, so far as to allow the teeth $k\ k$ to engage with the catches on the lower ends of the said springs.

After releasing the teeth, as described, if the operator wishes the rake to make but a half revolution, he will remove the pressure on the stretcher $c$, and allow the tips of the draw-spring to project as at first, to act as a stop for the teeth.

Having thus described my invention, what I claim as new, and desire to secure by Letters Patent, is—

1. The device for releasing the teeth $k\ k$, composed of the draw-spring $n$, or its equivalent, operating in connection with the lever-frame described, or other similar device, all arranged substantially as described, and for the purposes set forth.

2. The arrangement of the springs G G, with suitable catches, and wipes $m\ m$, together with the backing and sustaining-springs $g\ g$, for the purpose of preventing a back revolution of the rake when operating, substantially in the manner as described.

WILLIAM READ.

Witnesses:
HENRY CONNETT, Jr.,
A. M. CONNETT.